(12) United States Patent
Yang et al.

(10) Patent No.: US 11,458,528 B2
(45) Date of Patent: Oct. 4, 2022

(54) WHEEL AUTOMATIC CLOSED DIE FORGING PRODUCTION LINE AND ALUMINUM ALLOY WHEEL

(71) Applicant: CITIC Dicastal CO., LTD., Hebei (CN)

(72) Inventors: Jinling Yang, Qinhuangdao (CN); Xiaoting Zhu, Qinhuangdao (CN); Zeyun Ma, Qinhuangdao (CN); Li Yang, Qinhuangdao (CN); Weizhou Liu, Qinhuangdao (CN); Naizheng Hu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 499 days.

(21) Appl. No.: 16/527,709

(22) Filed: Jul. 31, 2019

(65) Prior Publication Data
US 2020/0222971 A1 Jul. 16, 2020

(30) Foreign Application Priority Data
Jan. 15, 2019 (CN) .......................... 201910034693.9

(51) Int. Cl.
 *B21K 1/40* (2006.01)
 *B21J 17/00* (2006.01)
 *B21K 27/06* (2006.01)
 *B21K 27/02* (2006.01)

(52) U.S. Cl.
 CPC ................. *B21K 1/40* (2013.01); *B21J 17/00* (2013.01); *B21K 27/02* (2013.01); *B21K 27/06* (2013.01); *B23P 2700/50* (2013.01)

(58) Field of Classification Search
CPC .......... B21K 1/40; B21K 27/02; B21K 27/06; B21K 27/04; B21K 1/32; B21J 17/00; B21J 5/025; B21J 9/022; B23P 2700/50; B21D 22/14; B21D 53/30
See application file for complete search history.

(56) References Cited

U.S. PATENT DOCUMENTS

| | | | | |
|---|---|---|---|---|
| 4,035,891 A | * | 7/1977 | Lucas | B21K 1/28 29/894.323 |
| 4,316,637 A | * | 2/1982 | Reynolds | B60B 3/06 29/894.38 |
| 5,803,552 A | * | 9/1998 | Kato | B60B 7/066 301/37.41 |

* cited by examiner

*Primary Examiner* — Lee A Holly
(74) *Attorney, Agent, or Firm* — Syncoda LLC; Feng Ma

(57) ABSTRACT

A wheel automatic closed die forging production line includes a sawing machine, a first transfer track, a bar heating furnace, a first manipulator, an oscillating rolling machine, a second manipulator, a primary forging hydraulic machine, an intermediate heating furnace, a third manipulator, a finish forging hydraulic machine, a wheel transfer block, a fourth manipulator, a cutting, expanding and punching hydraulic machine, a second transfer track, a spinning machine, a fifth manipulator, a third transfer track, a heat treatment furnace, a fourth transfer track, a machining unit, a sixth manipulator and a fifth finished product track, and can improve mechanical and the physical properties of the wheel product, the wheel forging effect and the yield. Aluminum and magnesium alloy wheel compression molding is realized, reducing cost, time and labor for secondary machining and reshaping, and improving production safety and efficiency.

4 Claims, 4 Drawing Sheets

WHEEL AUTOMATIC CLOSED DIE FORGING PRODUCTION LINE AND ALUMINUM ALLOY WHEEL

CROSS-REFERENCE TO RELATED APPLICATION

The present application claims benefit of Chinese Patent Application No. 201910034693.9, filed on Jan. 15, 2019, the contents of which are hereby incorporated by reference in their entirety.

BACKGROUND

In an existing technique, conventional wheel production processes include a low-pressure casting process and a gravity casting process. A wheel forging process is a brand-new change of a domestic wheel production process after traditional gravity and low-pressure wheel casting processes, common problems of conventional casting can be greatly reduced and completely eradicated, automation of wheel manufacturing can be realized, and the wheel forging process is a new technique which is competitive internationally, and has good market disclosure prospect. A wheel automatic closed die forging process is a new process which is newly researched and developed on the basis of open die forging. Closed die forging and open die forging have the following differences: a bridge opening flash design of the open die forging is omitted, and excess materials of flashes are saved. In a closed die forging process, a cavity needs to be closed ahead of time, a spin-forged blank is formed in a closed forging die cavity, and it ensures that forming is implemented in the die cavity in a closed manner and flashes do not exist after forming. Although the flashes are omitted in closed die forging and the utilization rate of a metal material is increased, the requirements of the closed die forging to volume accuracy, shape reasonability, forging temperature control, equipment beating ability, beating control and the like of a blank are high. Therefore, how to modify an automobile hub production line and improve manufacturing efficiency is of great significance for the wheel manufacturing industry.

SUMMARY

The disclosure relates to the technical field of manufacturing of automobile hubs, and particularly relates to an aluminum alloy wheel automatic closed die forging production line.

An embodiment of the disclosure provides a wheel automatic closed die forging production line to modify an automobile hub manufacturing process and improve the manufacturing efficiency, and an automatic production and manufacturing process of an aluminum alloy wheel is met.

In the first aspect, provided is a wheel automatic closed die forging production line which is characterized by comprising a sawing machine, a first transfer track, a bar heating furnace, a first manipulator, an oscillating rolling machine, a second manipulator, a primary forging hydraulic machine, an intermediate heating furnace, a third manipulator, a finish forging hydraulic machine, a wheel transfer block, a fourth manipulator, a cutting, expanding and punching hydraulic machine, a second transfer track, a spinning machine, a fifth manipulator, a third transfer track, a heat treatment furnace, a fourth transfer track, a machining unit, a sixth manipulator and a fifth finished product track; the sawing machine is used for machining bars which meet forging requirements; the first transfer track is arranged between the sawing machine and the bar heating furnace, and is used for transferring the bars; the bar heating furnace is used for preheating the bars, and the temperature can be controlled at 470-500 DEG C.; the first manipulator is arranged between the bar heating furnace and the oscillating rolling machine, and is used for transferring the bars; the oscillating rolling machine is used for spin-forging machining on a wheel blank; the second manipulator is arranged among the oscillating rolling machine, the primary forging hydraulic machine and the intermediate heating furnace, and is used for transferring the wheel blank from the oscillating rolling machine to the primary forging hydraulic machine and transferring the wheel blank from the primary forging hydraulic machine to the intermediate heating furnace; the primary forging hydraulic machine is used for carrying out primary closed die forging on the wheel blank; the intermediate heating furnace is arranged between the primary forging hydraulic machine and the finish forging hydraulic machine, and is used for carrying out intermediate heating of closed die forging of the wheel blank, and the temperature can be controlled at 470-500 DEG C.; the finish forging hydraulic machine is used for carrying out finish closed die forging of the wheel blank; the third manipulator is arranged among the intermediate heating furnace, the finish forging hydraulic machine and the wheel transfer block, and is used for transferring the wheel blank from the intermediate heating furnace to the finish forging hydraulic machine and transferring the wheel blank from the finish forging hydraulic machine to the wheel transfer block; the fourth manipulator is arranged among the wheel transfer block, the cutting, expanding and punching hydraulic machine and the second transfer track, and is used for transferring the wheel blank from the wheel transfer block to the cutting, expanding and punching hydraulic machine and transferring the wheel blank from the cutting, expanding and punching hydraulic machine to the second transfer track; and the cutting, expanding and punching hydraulic machine is used for carrying out edge cutting, hole expanding, rim flaring, window punching and central hole punching composite forging on the wheel blank. The second transfer track is arranged between the cutting, expanding and punching hydraulic machine and the spinning machine, and is used for transferring the wheel blank; the fifth manipulator is arranged among the second transfer track, the spinning machine and the third transfer track, and is used for transferring the wheel blank from the second transfer track to the spinning machine and transferring the wheel blank from spinning machine to the third transfer track; the spinning machine is used for machining the rim of the wheel blank; the third transfer track is arranged between the spinning machine and the heat treatment furnace, and is used for transferring the wheel blank; the heat treatment furnace is used for treating the temperature of the wheel blank, and is a continuous operation furnace, and the temperature can be respectively maintained at three temperature ranges including 470-500 DEG C., 70-100 DEG C. and 150-180 DEG C.; the fourth transfer track is arranged between the heat treatment furnace and the machining unit, and is used for transferring the wheel blank; the machining unit is used for machining the wheel blank until the wheel blank meets the requirement of a product chart; the sixth manipulator is arranged among the fourth transfer track, the machining unit and the fifth finished product track, and is used for transferring the wheel blank from the fourth transfer track to the machining unit and transferring a finished wheel from the machining unit to the fifth finished product track; and the fifth finished product track is used for discharging the finished wheel.

In an embodiment, in an aluminum alloy wheel automatic closed die forging production line, a die for closed die forging of each of the primary forging hydraulic machine and the finish forging hydraulic machine comprises an upper die base, an upper die core, an upper ejector, a lower die base, a pressure bearing plate, a lower die core, a lower ejector, a lower die plate and an upper die plate; each pressure bearing plate is fastened to the bottom surface of the corresponding upper die plate, each upper die base is fixed around the outer periphery of the corresponding pressure bearing plate, the outer periphery of each pressure bearing plate is clamped between the corresponding upper die plate and the corresponding upper die base, each upper die core is fixed on the bottom surface of the corresponding pressure bearing plate, the upper end of each upper die core is in contact with the corresponding upper die base, and each upper ejector is fixedly arranged at the center positions of the corresponding upper die plate, the corresponding pressure bearing plate and the corresponding upper die core in a penetrating manner; each lower die base is fastened to the top of the corresponding lower die plate, each lower die core is fastened to the recess of the middle of the corresponding lower die base, and each lower ejector is fixedly arranged at the center positions of the corresponding lower die plate, the corresponding lower die base and the corresponding lower die core in a penetrating manner; and the tip portion of each upper ejector is opposite to the tip portion of the corresponding lower ejector, and wheel blank materials are placed in the middles of each upper die core and the corresponding lower die core.

In an embodiment, in the aluminum alloy wheel automatic closed die forging production line, the cutting, expanding and punching hydraulic machine comprises a lower die base, a pedestal, a supporting column, a lower die, window punches, a flaring block, a central hole punch, a material returning device, an upper die, an upper die base bottom plate, a wheel blank and an upper die base; the pedestal is fixed to the top of the lower die base, the supporting column is fixed on the pedestal, the lower die is fixed on the supporting column, and the wheel blank is fixed on the lower die; the upper die base bottom plate is fixed under the upper die base, the upper die is fixed on the upper die base bottom plate; the flaring block is fixed at the edge of the upper die, the window punches are further arranged at the positions, which are close to the flaring block, of the upper die, and the central hole punch is arranged at the center position of the upper die; and the material returning device is arranged at the center positions of the upper die base, the upper die base bottom plate and the upper die and surrounds the central hole punch.

In an embodiment, in the aluminum alloy wheel automatic closed die forging production line, various modules of the cutting, expanding and punching hydraulic machine are fixedly connected in a screwed manner.

In an embodiment, in the aluminum alloy wheel automatic closed die forging production line, the sawing machine is an automatic sawing machine, the bar heating furnace is an automatic heating furnace, the oscillating rolling machine is an automatic spin-forging press, the primary forging hydraulic machine and the finish forging hydraulic machine are automatic die forging presses, the intermediate heating furnace is an automatic intermediate heating furnace, the spinning machine is an automatic spinning machine, the heat treatment furnace is an automatic heat treatment furnace, and the machining unit is an automatic machining tool unit.

In the second aspect, an embodiment of the disclosure provides an aluminum alloy wheel which is characterized in that the aluminum alloy wheel is manufactured by the aluminum alloy wheel automatic closed die forging production line.

As such, the disclosure provides the wheel automatic closed die forging production line, the mechanical property and the physical property of a wheel finished product, a wheel forging effect and the yield can be greatly improved, complicated aluminum and magnesium alloy wheel compression molding is realized, an aluminum alloy and aluminum-magnesium alloy wheel pressing process is further simplified, costs, time and labors for secondary machining and reshaping in the later period are greatly saved, and the safety and working efficiency of equipment in production and manufacturing are improved. Pre-forging pressing, finish forging pressing and hole expanding and edge cutting hydraulic machines of the forging process are operated visibly in the whole process, and injury of harmful aerial fog to health of operators can be prevented effectively. In addition, workpiece feeding and loading positioning is accurate, operation is facilitated, the degree of automation is high, and thus, an automatic production and manufacturing process for aluminum alloy and aluminum-magnesium alloy wheels can be met.

BRIEF DESCRIPTION OF THE DRAWINGS

In order to more clearly explain the technical solution in the embodiments of the disclosure, drawings which require to be used in description of the embodiments are simply introduced below, obviously, the drawings in description below are some embodiments of the disclosure, and those having ordinary skill in the art can further acquire other drawings without creative efforts according to those drawings.

Figure 1:
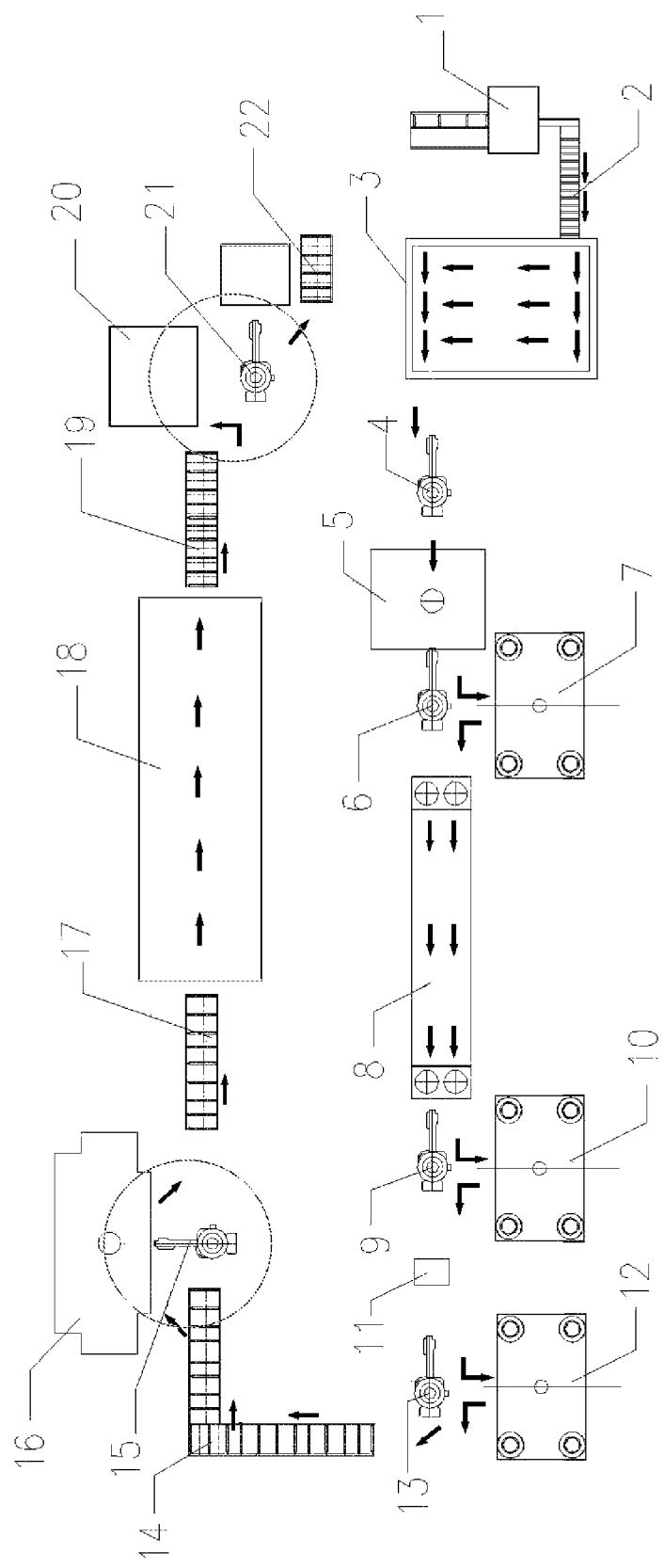
FIG. 1 is a schematic diagram of an aluminum alloy wheel automatic closed die forging production line.

1—sawing machine, 2—first transfer track, 3—bar heating furnace, 4—first manipulator, 5—oscillating rolling machine, 6—second manipulator, 7—primary forging hydraulic machine, 8—intermediate heating furnace, 9—third manipulator, 10—finish forging hydraulic machine, 11—wheel transfer block, 12—cutting, expanding and punching hydraulic machine, 13—fourth manipulator, 14—second transfer track, 15—fifth manipulator, 16—automatic spinning machine, 17—third transfer track, 18—heat treatment furnace, 19—fourth transfer track, 20—machining unit, 21—sixth manipulator, and 22—fifth finished product track; 1-1—upper die base, 1-2—upper die core, 1-3—upper ejector, 1-4—lower die base, 1-5—pressure bearing plate, 1-6—lower die core, 1-7—lower ejector, 1-8—lower die plate, and 1-9—upper die plate; and 2-1—lower die base, 2-2—pedestal, 2-3—supporting column, 2-4—lower die, 2-5—window punch, 2-6—flaring block, 2-7—central hole punch, 2-8—material returning device, 2-9—upper die, 2-10—upper die base bottom plate, 2-11—wheel blank, 2-12—screw, and 2-13—upper die base.

DETAILED DESCRIPTION

The technical solution in the embodiments of the disclosure is clearly and completely described in combination with drawings of the embodiments of the disclosure below, and obviously, the described embodiments are part of embodiments of the disclosure rather than all embodiments. Based on the embodiments of the disclosure, all the other embodiments obtained by those having ordinary skill in the art without any creative works are within the protection scope of the disclosure.

The terms 'first', 'second', 'third', 'fourth' and the like in the specification and in the claims of the disclosure are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the disclosure means that a particular feature, structure or characteristic described in connection with the embodiments is included in at least one embodiment of the disclosure. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the disclosure can be combined to other embodiments.

In order to further understand the content, features and functions of the disclosure, the following embodiments are given and illustrated with the attached drawings as follows:

as shown in FIG. 1, an aluminum alloy wheel automatic closed die forging production line is characterized by comprising: a sawing machine 1, a first transfer track 2, a bar heating furnace 3, a first manipulator 4, an oscillating rolling machine 5, a second manipulator 6, a primary forging hydraulic machine 7, an intermediate heating furnace 8, a third manipulator 9, a finish forging hydraulic machine 10, a wheel transfer block 11, a cutting, expanding and punching hydraulic machine 12, a fourth manipulator 13, a second transfer track 14, a fifth manipulator 15, an automatic spinning machine 16, a third transfer track 17, a heat treatment furnace 18, a fourth transfer track 19, a machining unit 20, a sixth manipulator 21 and a fifth finished product track 22; the sawing machine 1 is used for machining bars which meet forging requirements; the first transfer track 2 is arranged between the sawing machine 1 and the bar heating furnace 3, and is used for transferring the bars; the bar heating furnace 3 is used for preheating the bars; the first manipulator 4 is arranged between the bar heating furnace 3 and the oscillating rolling machine 5, and is used for transferring the bars; the oscillating rolling machine 5 is used for carrying out spin-forging machining on a wheel blank; the second manipulator 6 is arranged among the oscillating rolling machine 5, the primary forging hydraulic machine 7 and the intermediate heating furnace 8, and is used for transferring the wheel blank from the oscillating rolling machine 5 to the primary forging hydraulic machine 7 and transferring the wheel blank from the primary forging hydraulic machine 7 to the intermediate heating furnace 8; the primary forging hydraulic machine 7 is used for carrying out primary closed die forging on the wheel blank; the intermediate heating furnace 8 is arranged between the primary forging hydraulic machine 7 and the finish forging hydraulic machine 10, and is used for carrying out intermediate heating of closed die forging of the wheel blank; and the finish forging hydraulic machine 10 is used for carrying out finish closed die forging on the wheel blank; the third manipulator 9 is arranged among the intermediate heating furnace 8, the finish forging hydraulic machine 10 and the wheel transfer block 11, and is used for transferring the wheel blank from the intermediate heating furnace 8 to the finish forging hydraulic machine 10 and transferring the wheel blank from the finish forging hydraulic machine 10 to the wheel transfer block 11; the fourth manipulator 13 is arranged among the wheel transfer block 11, the cutting, expanding and punching hydraulic machine 12 and the second transfer track 14, and is used for transferring the wheel blank from the wheel transfer block 11 to the cutting, expanding and punching hydraulic machine 12 and transferring the wheel blank from the cutting, expanding and punching hydraulic machine 12 to the second transfer track 14; and the cutting, expanding and punching hydraulic machine 12 is used for carrying out edge cutting, hole expanding, rim flaring, window punching and central hole punching composite forging on the wheel blank. The second transfer track 14 is arranged between the cutting, expanding and punching hydraulic machine and the automatic spinning machine, and is used for transferring the wheel blank; the fifth manipulator 15 is arranged among the second transfer track 14, the automatic spinning machine 16 and the third transfer track 17, and is used for transferring the wheel blank from the second transfer track 14 to the automatic spinning machine 16 and transferring the wheel blank from the automatic spinning machine 16 to the third transfer track 17; the automatic spinning machine 16 is used for machining the rim of the wheel blank; the third transfer track 17 is arranged between the automatic spinning machine 16 and the heat treatment furnace 18, and is used for transferring the wheel blank; the heat treatment furnace 18 is used for treating the temperature of the wheel blank; the fourth transfer track 19 is arranged between the heat treatment furnace 18 and the machining unit 20, and is used for transferring the wheel blank; the machining unit 20 is used for machining the wheel blank until the wheel blank meets the requirement of a product chart; the sixth manipulator 21 is arranged among the fourth transfer track 19, the machining unit 20 and the fifth finished product track 22, and is used for transferring the wheel blank from the fourth transfer track 19 to the machining unit 20 and transferring a finished wheel from the machining unit 20 to the fifth finished product track 22; and the fifth finished product track 22 is used for discharging the finished wheel.

Figure 2:
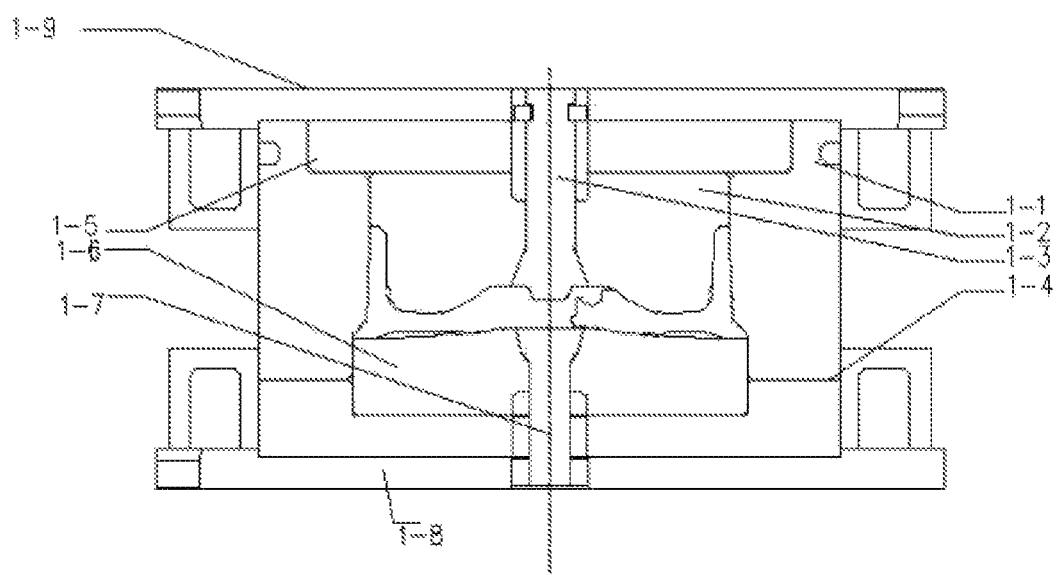
FIG. 2 is a structure diagram of a die for closed die forging of primary forging and finish forging.

The design of a die for closed die forging of primary forging and finish forging is based on a step diagram and a forging process. The principle of the design is as follows: an oscillating-rolled blank is formed uniformly in the primary forging die, the streamline of the oscillating-rolled blank is smooth, meanwhile, forming is uniform during final forming of finish forging, and the filling property is good; and the die works smoothly and stably on a press, and is convenient to mount. The design refers to an existing design of an open primary and finish forging die, a man-machine interaction technology is used, and UG software three-dimensional molding is used. The designed structure of the die for closed die forging of primary forging and finish forging is as shown in FIG. 2, the die for closed die forging of primary forging and finish forging comprises an upper die base 1-1, an upper die core 1-2, an upper ejector 1-3, a lower die base 1-4, a pressure bearing plate 1-5, a lower die core 1-6, a lower ejector 1-7, a lower die plate 1-8 and an upper die plate 1-9; the pressure bearing plate 1-5 is fastened to the bottom surface of the upper die plate 1-9, the upper die base 1-1 is fixed around the outer periphery of the pressure bearing plate 1-5, the outer periphery of the pressure bearing plate 1-5 is clamped between the upper die plate 1-9 and the upper die base 1-1, the upper die core 1-2 is fixed on the bottom surface of the pressure bearing plate 1-5, the upper end of the upper die core 1-2 is in contact with the upper die base 1-1, and the upper ejector 1-3 is fixedly arranged at the center positions of the upper die plate 1-9, the pressure bearing plate 1-5 and the upper die core 1-2 in a penetrating manner; the lower die base 1-4 is fastened to the top of the lower die plate 1-8, the lower die core 1-6 is fastened to the recess of the middle of the lower die base 1-4, and the lower ejector 1-7 is fixedly arranged at the center positions of the lower die plate 1-8, the lower die base 1-4 and the lower die core 1-6 in a penetrating manner; and the tip portion of the upper ejector 1-3 is opposite to the tip portion of the lower ejector 1-7, and the wheel blank materials are placed in the middles of the upper die core 1-2 and the lower die core 1-6. In the design of the die, a bridge opening flash design of open die forging is omitted, and excess materials of flashes are saved. In addition, in a closed die forging process, a cavity needs to be closed ahead of time, and the oscillating-rolled blank is formed in the closed primary forging die cavity. Before thixoforming, the upper die base 1-1 and the lower die core 1-6 are closed ahead of time, and it ensures that forming is implemented in the die cavity in a closed manner and flashes do not exist after forming.

By a hole expanding, window punching and central hole punching composite die drawing design, a rim portion is subjected to flaring forming, window punching, central hole punching and excess metal removing to make preparations for spinning of the rim. Hole expanding, central hole punching and window punching are completed at a time, follow-up machining time is shortened, and the working efficiency is improved.

Figure 3:
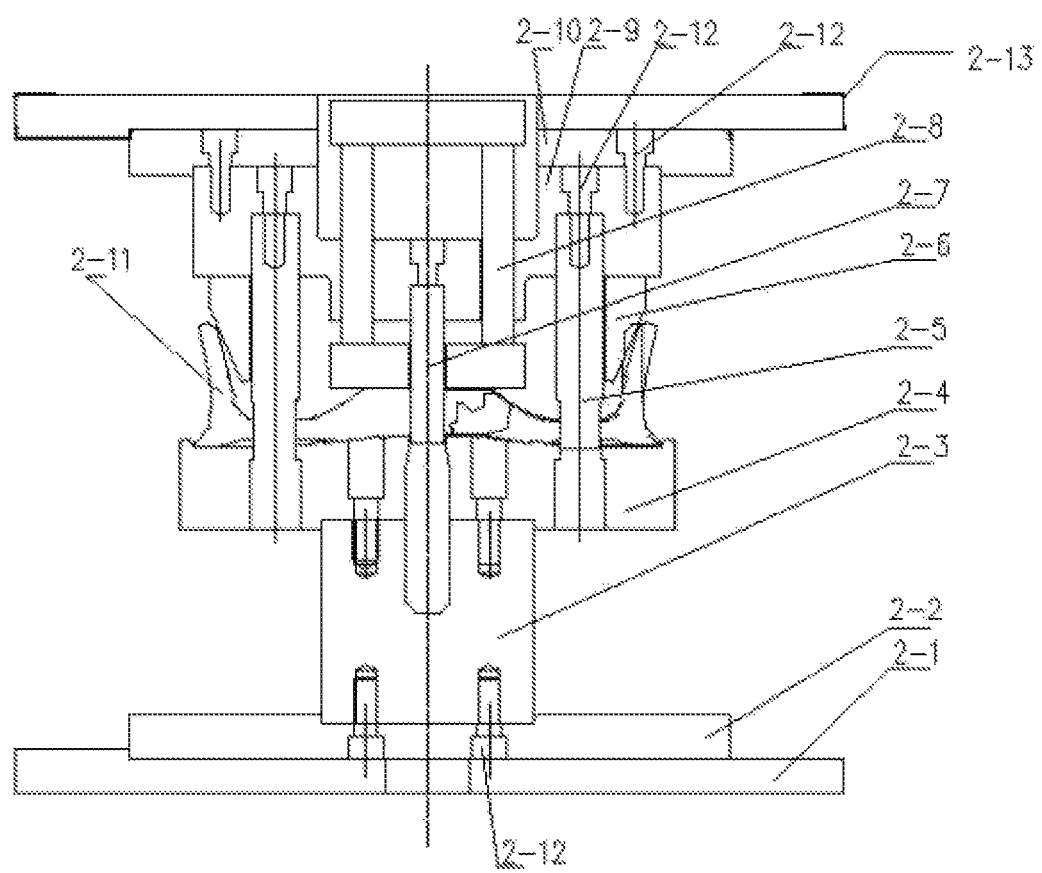
FIG. 3 is a plan schematic diagram of a cutting, expanding and punching hydraulic machine.

In FIG. 3, a plan diagram of the cutting, expanding and punching hydraulic machine is shown, the cutting, expanding and punching hydraulic machine comprises a lower die base 2-1, a pedestal 2-2, a supporting column 2-3, a lower die 2-4, window punches 2-5, a flaring block 2-6, a central hole punch 2-7, a material returning device 2-8, an upper die 2-9, an upper die base bottom plate 2-10, a wheel blank 2-11 and an upper die base 2-13; the pedestal 2-2 is fixed on the lower die base 2-1, the supporting column 2-3 is fixed on the pedestal 2-2, the lower die 2-4 is fixed on the supporting column, and the wheel blank 2-11 is fixed on the lower die 2-4; the upper die base bottom plate 2-10 is fixed under the upper die base 2-13, and the upper die 2-9 is fixed on the upper die base bottom plate 2-10; the flaring block 2-6 is fixed at the edge of the upper die 2-9, the window punches 2-5 are further arranged at the positions, which are close to the flaring block 2-6, of the upper die 2-9, and the central hole punch 2-7 is arranged at the center position of the upper die 2-9; and the material returning device 2-8 is arranged at the center positions of the upper die base 2-13, the upper die base bottom plate 2-10 and the upper die 2-9 and surrounds the central hole punch 2-7.

The various modules are fixed in a screwed connection manner, and as shown in FIG. 3, the various modules are fixedly connected by screws 2-12.

Figure 4:
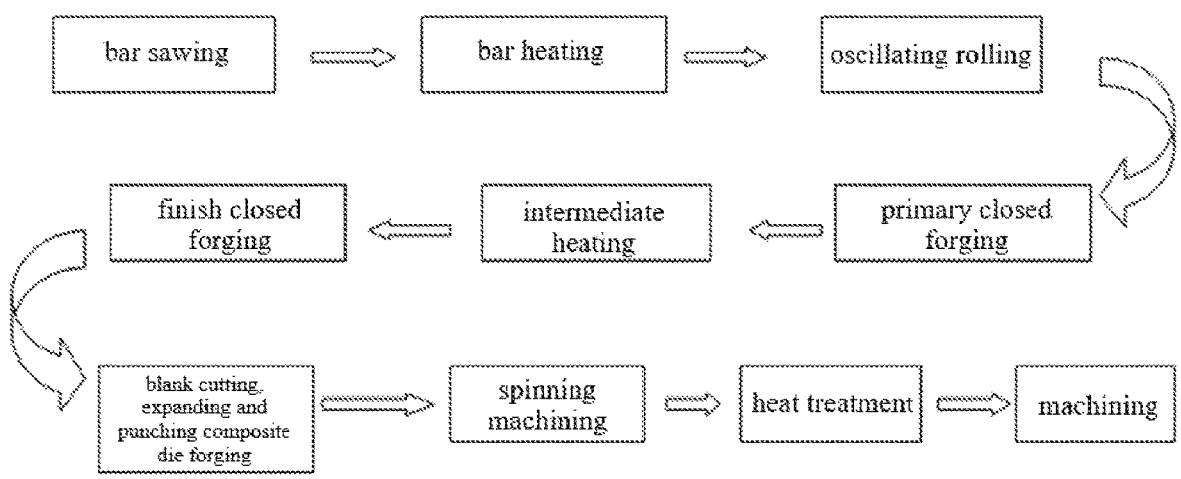
FIG. 4 is a flow diagram of a wheel automatic closed die forging process.

According to a production line as shown in FIG. 1, an aluminum alloy wheel automatic closed die forging production process is designed, and specific production steps can include the following, as illustrated in FIG. 4.

In the first step, sawing of bars is carried out, the bars which meet a forging requirement are machined by sawing of the automatic sawing machine, and the sawed bars are transferred to a preheating furnace through a track.

In the second step, preheating of the bars is carried out, the bars are heated by the automatic heating furnace, the temperature is controlled at 470-500 DEG C., and the sawed bars are transferred to a spin-forging press through the track and a robot;

In the third step, oscillating rolling of the wheel blank is carried out, and the wheel blank is subjected to spin-forging machining by the automatic spin-forging press; according to an oscillating rolling process, due to local linear contact in oscillating rolling, successive pressurizing is carried out for continuous forming, contact area and unit pressure are small, during forming of a preform, the tonnage of used equipment is low, deformation force is $\frac{1}{5}$-$\frac{1}{20}$ of common forging deformation force, after the preform is subjected to oscillating rolling, the inner structure of the preform is uniform and fine, the performance is improved, the quality of a product is good, and the product is unlikely to crack; and the wheel blank is transferred to a primary die forging press by the robot.

In the fourth step, primary closed die forging of the wheel blank is carried out, the wheel blank is pre-forged by the automatic die forging press and the temperature is controlled at 470-500 DEG C.; according to the primary forging process, due to the complicated shape of a part and difficulty in forming, a closed die forging forming technology is additionally used between a spin-forging process and a finish forging process, and by the primary forging method process, the shape of a spin-forged blank is close to the shape of a finish forged piece after primary forging deformation of the spin-forged blank, thus, during finish forging, it ensures that a die cavity is full and defects such as folding or cracks do not exist, and meanwhile, the requirement of finish forging to the tonnage of the equipment is also reduced; and the wheel blank is transferred to intermediate heating through the robot.

In the fifth step, intermediate heating of the wheel blank is carried out, it ensures that intermediate heating of the pre-forged wheel blank is controlled at the temperature of 470-500 DEG C., and the wheel blank is transferred to a finish die forging press through the track and the robot.

In the sixth step, finish closed die forging of the wheel blank is carried out, the wheel blank is subjected to finish forging by the automatic die forging press and the temperature is controlled at 470-500 DEG C.; the principle of the finish forging process is the same as the principle of primary forging forming, closed die forging is adopted, and finishing forming of wheel spokes is completed; in a finish closed die forging process, a cavity needs to be closed ahead of time, forming is implemented in a die cavity for finish closed die forging, and it ensures that forming is implemented in the die cavity in a closed manner and flashes do not exist after forming; and the wheel blank is transferred to a composite die forging press through the robot.

In the seventh step, in hole expanding, window punching and central hole punching composite forging on the wheel blank, the wheel blank is subjected to hole expanding, hole punching and composite forging by the automatic die forging press; by a rim flaring, window punching and central hole punching process, the rim portion is subjected to flaring forming, window punching, central hole punching and excess metal removal to make preparations for spinning of the rim; and the wheel blank is transferred to the spinning machine by the robot and the track.

In the eighth step, spinning machining is carried out, the rim of the wheel blank is subjected to spinning machining by the automatic spinning machine; by a spinning process, the rim portion is subjected to final spinning forming; and the wheel blank is transferred into the heat treatment furnace through the robot and the track.

In the ninth step, heat treatment of the wheel blank is carried out, the wheel blank is subjected to heat treatment by the heat treatment furnace, a heat treatment process comprises three craft processes including solid solution, quenching and aging, the temperature of solid solution is controlled at 470-500 DEG C., the temperature of quenching is controlled at 70-100 DEG C., the temperature of aging is controlled at 150-180 DEG C., and after heat treatment is completed, the wheel blank is transferred to the machining unit through the robot and the track.

In the tenth step, machining of the wheel blank is carried out, and the wheel blank is machined by the automatic machining tool unit until the wheel blank meets the requirement for a product chart.

Secondly, the disclosure further relates to an aluminum alloy wheel which is characterized in that the aluminum alloy wheel is manufactured by the aluminum alloy wheel automatic closed die forging production line.

Visibly, the disclosure provides the wheel automatic closed die forging production line, the mechanical property and the physical property of a wheel finished product, a wheel forging effect and the yield can be greatly improved, complicated aluminum and magnesium alloy wheel compression molding is realized, an aluminum alloy and aluminum-magnesium alloy wheel pressing process is further simplified, costs, time and labors for secondary machining and reshaping in the later period are greatly saved, and the safety and working efficiency of equipment in production and manufacturing are improved. Pre-forging pressing, finish forging pressing and hole expanding and edge cutting hydraulic machines of the forging process are operated visibly in the whole process, and injury of harmful aerial fog to health of operators can be prevented effectively. In addition, workpiece feeding and loading positioning is accurate, operation is facilitated, the degree of automation is high, and thus, an automatic production and manufacturing process for aluminum alloy and aluminum-magnesium alloy wheels can be met.

The embodiments of the disclosure are described in detail above, particular examples are used herein to explain the principle and embodiments of the disclosure, and the above description of the embodiments is only used to help understanding the methods and core concept of the disclosure; and meanwhile, for those having ordinary skill in the art, according to the idea of the disclosure, there will be changes in the specific implementation mode and disclosure scope, in conclusion, the contents of the specification shall not be construed as a limitation of the disclosure.

The invention claimed is:

1. A wheel automatic closed die forging production line, comprising: a sawing machine, a first transfer track, a bar heating furnace, a first manipulator, an oscillating rolling machine, a second manipulator, a primary forging hydraulic machine, an intermediate heating furnace, a third manipulator, a finish forging hydraulic machine, a wheel transfer block, a fourth manipulator, a cutting, expanding and punching hydraulic machine, a second transfer track, a spinning machine, a fifth manipulator, a third transfer track, a heat treatment furnace, a fourth transfer track, a machining unit, a sixth manipulator and a fifth finished product track; wherein the sawing machine is used for machining bars which meet forging requirements; the first transfer track is arranged between the sawing machine and the bar heating furnace, and is used for transferring the bars; the bar heating furnace is used for preheating the bars, and the temperature can be controlled at 470-500 DEG C.; the first manipulator is arranged between the bar heating furnace and the oscillating rolling machine, and is used for transferring the bars; the oscillating rolling machine is used for carrying out spin-forging machining on a wheel blank; the second manipulator is arranged among the oscillating rolling machine, the primary forging hydraulic machine and the intermediate heating furnace, and is used for transferring the wheel blank from the oscillating rolling machine to the primary forging hydraulic machine and transferring the wheel blank from the primary forging hydraulic machine to the intermediate heating furnace; the primary forging hydraulic machine is used for carrying out primary closed die forging on the wheel blank; the intermediate heating furnace is arranged between the primary forging hydraulic machine and the finish forging hydraulic machine, and is used for carrying out intermediate heating of closed die forging of the wheel blank, and the temperature can be controlled at 470-500 DEG C.; the finish forging hydraulic machine is used for carrying out finish closed die forging of the wheel blank; the third manipulator is arranged among the intermediate heating furnace, the finish forging hydraulic machine and the wheel transfer block, and is used for transferring the wheel blank from the intermediate heating furnace to the finish forging hydraulic machine and transferring the wheel blank from the finish forging hydraulic machine to the wheel transfer block; the fourth manipulator is arranged among the wheel transfer block, the cutting, expanding and punching hydraulic machine and the second transfer track, and is used for transferring the wheel blank from the wheel transfer block to the cutting, expanding and punching hydraulic machine and transferring the wheel blank from the cutting, expanding and punching hydraulic machine to the second transfer track; and the cutting, expanding and punching hydraulic machine is used for carrying out edge cutting, hole expanding, rim flaring, window punching and central hole punching composite forging on the wheel blank, the second transfer track is arranged between the cutting, expanding and punching hydraulic machine and the spinning machine, and is used for transferring the wheel blank; the fifth manipulator is arranged among the second transfer track, the spinning machine and the third transfer track, and is used for transferring the wheel blank from the second transfer track to the spinning machine and transferring the wheel blank from the spinning machine to the third transfer track; the spinning machine is used for machining the rim of the wheel blank; the third transfer track is arranged between the spinning machine and the heat treatment furnace, and is used for transferring the wheel blank; the heat treatment furnace is used for treating the temperature of the wheel blank, and is a continuous operation furnace, and the temperature can be respectively maintained at three temperature ranges including 470-500 DEG C., 70-100 DEG C. and 150-180 DEG C.; the fourth transfer track is arranged between the heat treatment furnace and the machining unit, and is used for transferring the wheel blank; the machining unit is used for machining the wheel blank until the wheel blank meets the requirement of a product chart; the sixth manipulator is arranged among the fourth transfer track, the machining unit and the fifth finished product track, and is used for transferring the wheel blank from the fourth transfer track to the machining unit and transferring a finished wheel from the machining unit to the fifth finished product track; and the fifth finished product track is used for discharging the finished wheel;

wherein a die for closed die forging of each of the primary forging hydraulic machine and the finish forging hydraulic machine comprises an upper die base, an upper die core, an upper ejector, a lower die base, a pressure bearing plate, a lower die core, a lower ejector, a lower die plate and an upper die plate; each pressure bearing plate is fastened to the bottom surface of the corresponding upper die plate, each upper die base is fixed around the outer periphery of the corresponding pressure bearing plate, the outer periphery of each pressure bearing plate is clamped between the corresponding upper die plate and the corresponding upper die base, each upper die core is fixed on the bottom surface of the corresponding pressure bearing plate, the upper end of each upper die core is in contact with the corresponding upper die base, and each upper ejector is fixedly arranged at the center positions of the corresponding upper die plate, the corresponding pressure bearing plate and the corresponding upper die core in a penetrating manner; each lower die base is fastened to the top of the corresponding lower die plate, each lower die core is fastened to the recess of the middle of the corresponding lower die base, and each lower ejector is fixedly arranged at the center positions of the corresponding lower die plate, the corresponding lower die base and the corresponding lower die core in a penetrating manner; and the tip portion of each upper ejector is opposite to the tip portion of the corresponding lower ejector, and wheel blank materials are placed in the middles of each upper die core and the corresponding lower die core;

wherein the cutting, expanding and punching hydraulic machine comprises a lower die base, a pedestal, a supporting column, a lower die, window punches, a flaring block, a central hole punch, an upper die, an upper die base bottom plate, a wheel blank and an upper die base; the pedestal is fixed to the top of the lower die base, the supporting column is fixed on the pedestal, the lower die is fixed on the supporting column, and the wheel blank is fixed on the lower die; the upper die base bottom plate is fixed under the upper die base, the upper die is fixed on the upper die base bottom plate; the flaring block is fixed at the edge of the upper die, the window punches are further arranged at the positions, which are close to the flaring block, of the upper die, and the central hole punch is arranged at the center position of the upper die; and the oscillating rolling machine is an automatic spin-forging press.

2. The wheel automatic closed die forging production line according to claim 1, wherein various modules of the cutting, expanding and punching hydraulic machine are fixedly connected in a screwed manner.

3. The wheel automatic closed die forging production line according to claim 1, wherein the sawing machine is an automatic sawing machine, the primary forging hydraulic machine and the finish forging hydraulic machine are automatic die forging presses, the spinning machine is an automatic spinning machine, the machining unit is an automatic machining tool unit, the heat treatment furnace is an automatic heat treatment furnace, the bar heating furnace is an automatic heating furnace, and the intermediate heating furnace is an automatic intermediate heating furnace.

4. The wheel automatic closed die forging production line according to claim 1, wherein the sawing machine is an automatic sawing machine, the oscillating rolling machine is an automatic spin-forging press, the primary forging hydraulic machine and the finish forging hydraulic machine are automatic die forging presses, the spinning machine is an automatic spinning machine, the machining unit is an automatic machining tool unit, the heat treatment furnace is an automatic heat treatment furnace, the bar heating furnace is an automatic heating furnace, and the intermediate heating furnace is an automatic intermediate heating furnace.

\* \* \* \* \*